(12) United States Patent
Zhang et al.

(10) Patent No.: US 12,420,269 B1
(45) Date of Patent: Sep. 23, 2025

(54) SIMPLE PREPARATION METHOD AND USE OF SUPPORT OF CATALYST FOR HYDROGENATION

(71) Applicant: NANJING TECH UNIVERSITY, Nanjing (CN)

(72) Inventors: Jiuxuan Zhang, Nanjing (CN); Liu Yang, Nanjing (CN); Weihong Xing, Nanjing (CN); Rizhi Chen, Nanjing (CN)

(73) Assignee: NANJING TECH UNIVERSITY, Nanjing (CN)

( * ) Notice: Subject to any disclaimer, the term of this patent is extended or adjusted under 35 U.S.C. 154(b) by 0 days.

(21) Appl. No.: 19/214,086

(22) Filed: May 21, 2025

Related U.S. Application Data

(63) Continuation of application No. PCT/CN2023/092652, filed on May 8, 2023.

(30) Foreign Application Priority Data

Apr. 13, 2023  (CN) .......................... 202310393613.5

(51) Int. Cl.
B01J 27/26 (2006.01)
B01J 37/00 (2006.01)
B01J 37/02 (2006.01)
B01J 37/08 (2006.01)

(52) U.S. Cl.
CPC ........... *B01J 27/26* (2013.01); *B01J 37/0018* (2013.01); *B01J 37/0236* (2013.01); *B01J 37/082* (2013.01)

(58) Field of Classification Search
CPC ........ B01J 27/26; B01J 37/0018; B01J 23/75; B01J 37/0236; B01J 37/082
USPC ......................................... 502/175, 185, 325
See application file for complete search history.

(56) References Cited

U.S. PATENT DOCUMENTS

| | | | |
|---|---|---|---|
| 2021/0331140 A1 | 10/2021 | Ji et al. | |
| 2024/0228296 A1* | 7/2024 | Deng | .................. H01M 8/1004 |

FOREIGN PATENT DOCUMENTS

| | | | | | |
|---|---|---|---|---|---|
| CA | 2855920 | A1 | * | 5/2013 | ............. C01B 3/586 |
| CN | 104069883 | A | | 10/2014 | |
| CN | 106423251 | A | | 2/2017 | |
| CN | 106902842 | A | * | 6/2017 | ............... C07C 1/26 |
| CN | 107413366 | A | | 12/2017 | |
| CN | 108048866 | A | | 5/2018 | |
| CN | 108579781 | A | * | 9/2018 | .......... B01J 37/0201 |
| CN | 108686705 | A | | 10/2018 | |
| CN | 110479349 | A | * | 11/2019 | ............. C01B 13/02 |
| CN | 111647167 | A | | 9/2020 | |
| CN | 113150303 | A | | 7/2021 | |
| CN | 114192146 | A | | 3/2022 | |
| CN | 115764162 | A | | 3/2023 | |
| CN | 116899605 | A | * | 10/2023 | ............... B01J 27/24 |

OTHER PUBLICATIONS

Xu Wei et al., "Simple preparation of zeolitic imidizolate framework materials by solid phase transformation method without solvent thermal treatment." Chemical Journal of Chinese Universities 41 (8), pp. 1753-1759. (Year: 2020).*
English translation of International Search Report for PCT/CN2023/092652. (Year: 2024).*
Written Opinion for PCT/CN2023/092652. (Year: 2024).*
Xu Wei, et al., Facile Preparation of Zeolitic Imidazole Frameworks by Thermal Treatment Solid-Phase Transformation, Chemical Journal of Chinese Universities, 2020, pp. 1753-1759, vol. 41 No.8.

* cited by examiner

Primary Examiner — Patricia L. Hailey
(74) Attorney, Agent, or Firm — Bayramoglu Law Offices LLC

(57) ABSTRACT

A simple preparation method and use of a support of a catalyst for hydrogenation are provided. The support is prepared by a direct mixing method as follows: 2-methylimidazole is directly mixed with different cobalt sources, and then calcination and acid-washing are conducted. This method has advantages such as simple preparation process flow, short preparation cycle, low raw material cost, and high support output. A Pd@CN catalyst prepared from the support can exhibit a high catalytic activity when used in a reaction system for phenol hydrogenation to prepare cyclohexanone.

10 Claims, 7 Drawing Sheets

SIMPLE PREPARATION METHOD AND USE OF SUPPORT OF CATALYST FOR HYDROGENATION

CROSS REFERENCE TO THE RELATED APPLICATIONS

This application is a continuation application of International Application No. PCT/CN2023/092652, filed on May 8, 2023, which is based upon and claims priority to Chinese Patent Application No. 202310393613.5, filed on Apr. 13, 2023, the entire contents of which are incorporated herein by reference.

TECHNICAL FIELD

The present disclosure belongs to the technical field of preparation of catalysts for catalytic hydrogenation, and relates to a simple preparation method and use of a support of a catalyst for hydrogenation.

BACKGROUND

Zeolitic imidazolate frameworks (ZIFs) are produced through the coordination of metal ions (such as Zn and Co) with organic ligands (imidazole or derivatives thereof). ZIFs are a class of special metal-organic framework (MOF) materials, which have advantages such as large specific surface area, rich pore structures, easy functionalization, and high stability (thermal stability and chemical stability). Due to the high N contents and inheritable pore structures in organic ligands of ZIFs, ZIFs are ideal precursors for the preparation of nitrogen-doped carbon (CN) materials. CN materials are widely used in the field of catalysis.

The typical preparation process for the existing ZIF-67-based CN materials is as follows: ZIF-67 is first synthesized with methanol as a solvent and 2-methylimidazole and a cobalt source as ligands, then calcined in an Ar atmosphere, and washed with an acid to prepare a CN support (such as ZL201610912429.7 and ZL201710344634.2). This traditional preparation method for ZIF-derived CN requires the synthesis of specific ZIFs and the use of organic solvents in large quantities during synthesis, and is easy to cause the waste of uncoordinated raw materials in solutions, resulting in low utilization of raw materials. Moreover, this traditional preparation method involves complex synthesis steps and a significant raw material loss during synthesis, which leads to a low catalyst yield and a high production cost. The large consumption of solvents causes severe environmental pollution during production. Therefore, the current application of ZIF-based CN materials in catalysts is restricted by factors such as high preparation cost, low raw material utilization, environmentally-unfriendly preparation process, and low catalyst output, which limits the further application of ZIF-derived CN materials in the field of catalysis.

SUMMARY

In view of the challenges in the preparation of ZIF-derived Pd@CN catalysts, the present disclosure proposes the following innovative solution: 2-methylimidazole is directly mixed with different cobalt sources, and then calcination, acid-washing, and loading steps are carried out to produce an efficient Pd@CN catalyst for phenol hydrogenation.

In order to achieve the above objective, the present disclosure adopts the following technical solutions:

A CN support is prepared by a direct mixing method as follows: mixing 2-methylimidazole directly with a cobalt source, and calcining to produce Co@CN; and acid-washing the Co@CN followed by oven-drying to produce the CN support.

A preparation process of the CN support is as follows, unless otherwise specified, the concentration in the description refers to a mass concentration:

step 1, mixing the 2-methylimidazole with the cobalt source to produce a mixture;

step 2, calcining the mixture in an Ar atmosphere to produce Co@CN;

step 3, adding deionized water and a concentrated nitric acid solution to the Co@CN, and stirring;

step 4, conducting suction filtration to produce a solid, washing the solid several times with deionized water, and oven-drying to produce a CN support.

In the above method, the 2-methylimidazole and the cobalt source are directly mixed and then calcined to produce Co@CN, and then the Co@CN is washed with an acid to produce a CN material with rich pore structures. The support is prepared for the first time without the use of an organic solvent. In the process of preparing the support, there is no need to synthesize a specific ZIF material separately. The whole preparation process has advantages such as low raw material cost, high raw material utilization, simple preparation process flow, environmental friendliness, and high support output, and provides a new idea for the batch production of ZIF-derived CN materials. After the support is prepared by this method, Pd can be further loaded through impregnation to produce an efficient catalyst for liquid-phase hydrogenation of phenol. It has been verified that both the activity and stability of the catalyst can meet the industrial requirements.

Preferably, in the step 1, the cobalt source is any one of cobalt acetate tetrahydrate, cobalt chloride hexahydrate, and cobalt nitrate hexahydrate, and a molar ratio of the 2-methylimidazole to the cobalt source is (1-12):1.

Preferably, in the step 2, the calcining is conducted in a tube furnace with a heating rate of 1° C./min to 10° C./min, a calcining temperature of 550° C. to 1,000° C., and a calcining time of 100 min to 150 min.

Preferably, in the step 3, the Co@CN, the deionized water, and the concentrated nitric acid solution (66%) are in a mass ratio of 1:(20-30):(20-30), and the stirring is conducted for 30 min to 90 min at a temperature of 30° C. to 90° C. and a rate of 50 rpm to 300 rpm.

Preferably, in the step 4, the solid is washed 2 times to 5 times and oven-dried at 40° C. to 100° C. for 3 h to 5 h.

In the present disclosure, the 2-methylimidazole and the cobalt source are directly mixed and then calcined. During a heating process, the cobalt source is melt-coated on and reacts with the 2-methylimidazole to generate transition-state ZIF and a small amount of ZIF. During the calcination, the 2-methylimidazole partially volatilizes to generate an alkaline gas for etching, Co nanoparticles aggregate and grow, and the irregular massive structures of transition-state ZIF are retained and stacked to form pore structures. The CN materials prepared by the present disclosure have a large specific surface area, rich pore structures, a large mesopore proportion, and abundant defect sites. The support has a large specific surface area and abundant defect sites, which is conducive to the anchoring and dispersion of active sites. The abundant pore structures and the large mesopore proportion are favorable for reducing the diffusion resistance, promoting the mass transfer, and improving the utilization of active sites. This preparation method does not require the synthesis of specific ZIF and the use of an organic solvent, and has advantages such as simple preparation process flow, high utilization of organic ligands, low raw material cost, high catalyst yield, and environmental friendliness. Different cobalt sources and different molar ratios of raw materials have significant impacts on the performance and yield of the catalyst. When cobalt acetate tetrahydrate is adopted as the cobalt source and a ratio of the 2-methylimidazole to the cobalt acetate tetrahydrate is 4:1, there is a maximum yield of the CN support. The properties of the support meet the requirements of catalyst preparation and hydrogenation catalysis, and are suitable for industrial production and use. When 0.03 g of the catalyst is used for a catalytic reaction at 100° C. and 0.1 MPa for 30 min in a phenol-cyclohexane system, a conversion rate of phenol can reach 98.6% and the selectivity of cyclohexanone is maintained at 94.1%.

Compared with the prior art, the present disclosure has the following advantages and positive effects:

1. The abundant pore structures in the CN material of the present disclosure can reduce the diffusion resistance, enhance the mass transfer, and promote the contact between reaction substrates and active sites, making the CN material a desired support.
2. Compared with the traditional preparation method for ZIF-derived CN materials, the method of the present disclosure offers advantages such as simple process flow, environmental friendliness, low raw material cost, and high catalyst output.
3. A Pd@CN catalyst produced through the loading of Pd exhibits much higher catalytic activity than a ZIF-derived catalyst in a system of phenol hydrogenation to produce cyclohexanone. The present disclosure provides a new approach for the batch production of ZIF-derived CN materials and the further application of ZIF-derived CN materials in the catalysis field.

DETAILED DESCRIPTION OF THE EMBODIMENTS

Figure 1:
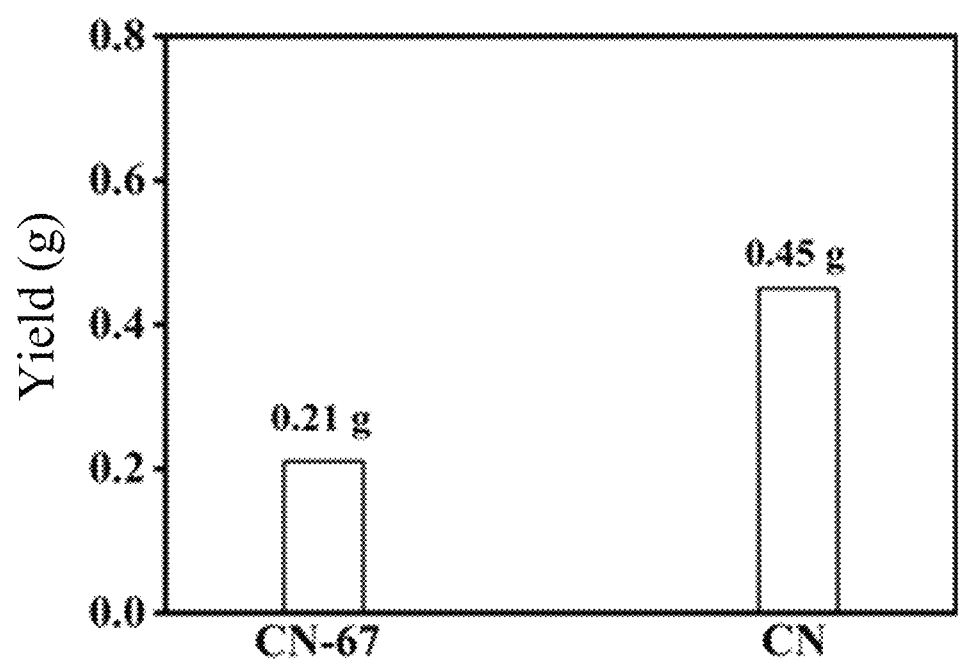
FIG. 1 shows the comparison of yields of CN-67 and CN.

To make the objectives, features, and advantages of the present disclosure comprehensible, the present disclosure will be further described below with reference to the specific embodiments. It should be noted that the embodiments of the present disclosure and the features in the embodiments may be combined with each other in case of no conflict.

In the following description, many specific details are set forth in order to facilitate the full understanding of the present disclosure, but the present disclosure can also be implemented in other ways other than those described herein. Therefore, the present disclosure is not limited by the specific embodiments disclosed below.

Example 1

(1) Preparation of a Co@CN Material 4.2 g of 2-methylimidazole was weighed and added to a 15 mL crucible, and then 1.8 g of cobalt acetate tetrahydrate was added to produce a reaction system. The crucible was placed in a tube furnace. In an Ar atmosphere, the reaction system was heated at a heating rate of 5° C./min to 800° C., then kept at 800° C. for 120 min, and naturally cooled to room temperature to produce the Co@CN material.

(2) Preparation of a CN Support

The Co@CN material prepared above was added to a round-bottomed flask, and then deionized water in a mass 25 times a mass of the Co@CN material and a concentrated nitric acid solution (mass fraction: 66%) in a mass 25 times the mass of the Co@CN material were added successively to produce a mixed system. The mixed system was stirred for 1 h at a rate of 200 rpm in a 60° C. water bath, then washed with deionized water 3 times, and dried in an oven at 70° C. for 4 h to produce the CN support, which was weighed to be 0.65 g.

(3) Preparation of a Pd@CN Catalyst 0.01 g of Pd(OAc)$_2$ was weighed and added to a round-bottomed flask, and 25 mL of an acetone solution was added for dissolution. After the dissolution was completed, 0.2 g of the CN support was added, and stirring was conducted at 25° C. and 100 rpm for 12 h. After the stirring was completed, rotary evaporation was conducted at 70° C. for 30 min to remove the solvent of acetone. Drying was conducted in an oven at 70° C. for 4 h to produce the Pd@CN catalyst.

The Pd@CN catalyst was used in an experiment of phenol hydrogenation to produce cyclohexanone. A reaction was conducted at 100° C. and 0.1 MPa under stirring at 100 rpm. Cyclohexane was adopted as a solvent. A phenol concentration was 1 wt. %. The Pd@CN catalyst was added at an amount of 6 g/L. After the reaction was conducted for 30 min, a conversion rate of phenol could reach 98.6%, and the selectivity was 94.1%.

Anything not specifically stated in the subsequent description was consistent with Example 1 or was a routine operation.

Example 2

(1) Preparation of Co@CN 1.54 g of 2-methylimidazole was weighed and added to a 15 mL crucible, and then 4.46 g of cobalt chloride hexahydrate was added to produce a reaction system. The crucible was placed in a tube furnace. In an Ar atmosphere, the reaction system was heated at a heating rate of 1° C./min to 550° C., then kept at 550° C. for 100 min, and naturally cooled to room temperature to produce the Co@CN material.

(2) Preparation of CN

The Co@CN prepared above was added to a round-bottomed flask, and then deionized water in a mass 20 times a mass of the Co@CN and concentrated nitric acid in a mass 20 times the mass of the Co@CN were added successively to produce a mixed system. The mixed system was stirred for 90 min at a rate of 50 rpm in a 30° C. water bath, then washed with deionized water 2 times, and dried in an oven at 40° C. for 5 h to produce the CN support. A yield of the prepared support was 0.34 g.

(3) Preparation of a Pd@CN Catalyst 0.01 g of Pd(OAc)$_2$ was weighed and added to a round-bottomed flask, and 20 mL of an acetone solution was added for dissolution. After the dissolution was completed, 0.2 g of the CN was added, and stirring was conducted at 10° C. and 50 rpm for 15 h. After the stirring was completed, rotary evaporation was conducted at 50° C. for 45 min to remove the solvent of acetone. Drying was conducted in an oven at 40° C. for 5 h to produce the Pd@CN catalyst.

The Pd@CN catalyst was used in an experiment of phenol hydrogenation to produce cyclohexanone. A reaction was conducted at 100° C. and 0.1 MPa under stirring at 100 rpm. Cyclohexane was adopted as a solvent. A phenol concentration was 1 wt. %. The Pd@CN catalyst was added at an amount of 6 g/L. After the reaction was conducted for 30 min, a conversion rate of phenol could reach 96.11%, and the selectivity was 94.0%.

Example 3

(1) Preparation of Co@CN 4.64 g of 2-methylimidazole was weighed and added to a 15 mL crucible, and then 1.36 g of cobalt nitrate hexahydrate was added to produce a reaction system. The crucible was placed in a tube furnace. In an Ar atmosphere, the reaction system was heated at a heating rate of 10° C./min to 1,000° C., then kept at 1,000° C. for 150 min, and naturally cooled to room temperature to produce the Co@CN material.

(2) Preparation of CN

The Co@CN prepared above was added to a round-bottomed flask, and then deionized water in a mass 30 times a mass of the Co@CN and concentrated nitric acid in a mass 30 times the mass of the Co@CN were added successively to produce a mixed system. The mixed system was stirred for 30 min at a rate of 300 rpm in a 90° C. water bath, then washed with deionized water 5 times, and dried in an oven at 100° C. for 3 h to produce the CN support. A yield of the prepared support was 0.45 g.

(3) Preparation of a Pd@CN Catalyst 0.01 g of Pd(OAc)$_2$ was weighed and added to a round-bottomed flask, and 30 mL of an acetone solution was added for dissolution. After the dissolution was completed, 0.2 g of the CN was added, and stirring was conducted at 40° C. and 300 rpm for 9 h. After the stirring was completed, rotary evaporation was conducted at 90° C. for 15 min to remove the solvent of acetone. Drying was conducted in an oven at 100° C. for 3 h to produce the Pd@CN catalyst.

The Pd@CN catalyst was used in an experiment of phenol hydrogenation to produce cyclohexanone. A reaction was conducted at 100° C. and 0.1 MPa under stirring at 100 rpm. Cyclohexane was adopted as a solvent. A phenol concentration was 1 wt. %. The Pd@CN catalyst was added at an amount of 6 g/L. After the reaction was conducted for 30 min, a conversion rate of phenol could reach 91.1%, and the selectivity was 95.3%.

Some comparative examples for support preparation are provided below.

1. Comparison of the Yield and Catalytic Performance Between the Direct Mixing Method and the Traditional Solvent Method For the convenient description, a support prepared by the direct mixing method was denoted as CN, and a support prepared by the traditional solvent method was denoted as CN-67.

The direct mixing method followed the preparation method in the examples, which would not be repeated here. The traditional solvent method was as follows: 50 mL of a solution of 0.8 mol/L 2-methylimidazole in methanol and 50 mL of a solution of 0.1 mol/L cobalt nitrate hexahydrate in methanol were prepared. The 2-methylimidazole solution was added to a 250 mL Erlenmeyer flask, and the cobalt nitrate hexahydrate solution was added under stirring at 100 rpm. A reaction was allowed for 5 min under stirring, and standing was allowed for 24 h. A product was collected through centrifugation, washed with methanol 2 times, and finally dried in an oven at 80° C. for 6 h to produce ZIF-67. 0.5 g of ZIF-67 was placed in a tube furnace and calcined for 2 h at 800° C. in an Ar atmosphere. During the calcination, a temperature was raised from room temperature to a target temperature with a heating rate of 1° C./min. The prepared Co@CN was washed for 3 h with a 30% nitric acid solution under continuous stirring at 60° C. and 100 rpm, then washed with deionized water 4 times, and dried at 80° C. for 12 h to produce CN-67.

With the same 6 g of a mixture of cobalt nitrate and 2-methylimidazole, a yield of ZIF-derived CN prepared by the direct mixing method in Example 3 was 0.45 g, and a yield of ZIF-derived CN prepared by the traditional method was 0.21 g. Apparently, the direct mixing method has a simple preparation process flow, a high support yield, environmental friendliness, and a low raw material cost. In the traditional synthesis method, only a ZIF crystal is retained, and a large amount of uncoordinated raw materials in a reaction solution are discarded and wasted. Moreover, the organic solvent is removed through centrifugation, which involves complicated operation steps and leads to a product loss. In the direct mixing method, the raw materials react during a heating process to generate a small amount of ZIF and transition-state ZIF, and after pyrolysis, a CN material with rich pore structures is produced. The direct mixing method does not require the synthesis of ZIF and the use of an organic solvent, avoids the waste of raw materials, and involves a simple and eco-friendly preparation process flow.

CN-67 was used as a support to prepare a Pd@CN catalyst. 0.01 g of Pd(OAc)$_2$ was weighed and added to a round-bottomed flask, and 20 mL of an acetone solution was added for dissolution. After the dissolution was completed, 0.2 g of the CN-67 was added, and stirring was conducted at 25° C. for 12 h. After the stirring was completed, rotary evaporation was conducted at 60° C. for 30 min to remove the solvent of acetone. Drying was conducted in an oven at 50° C. for 4 h to produce the Pd@CN catalyst.

The Pd@CN catalyst was used in an experiment of phenol hydrogenation to produce cyclohexanone. Under the reaction conditions of Examples 1 to 3, a conversion rate of phenol was 92.5%, and the selectivity was 94.8%, which were similar to those of Examples 1 to 3.

2. Influence of Different Cobalt Sources

Cobalt acetate tetrahydrate, cobalt chloride hexahydrate, and cobalt nitrate hexahydrate were respectively adopted as cobalt sources to prepare supports under the same preparation conditions as those in Example 1. The supports were shown in FIG. 4.

To facilitate the comparison, the prepared supports were further prepared into catalysts. The performance of the catalysts was investigated under the same conditions as those in Example 1. It can be seen from FIG. 4 that different cobalt sources will lead to different CN yields and Pd@CN properties. This is because anions of different cobalt sources have different charges, ionic radii, and interaction forces with Co$^{2+}$ and the prepared supports have different microscopic morphologies and physicochemical properties. When cobalt acetate is adopted as the cobalt source, the CN yield is the maximum, and the corresponding catalyst has the optimal performance.

3. Influence of Different Molar Ratios of Materials

Figure 5:
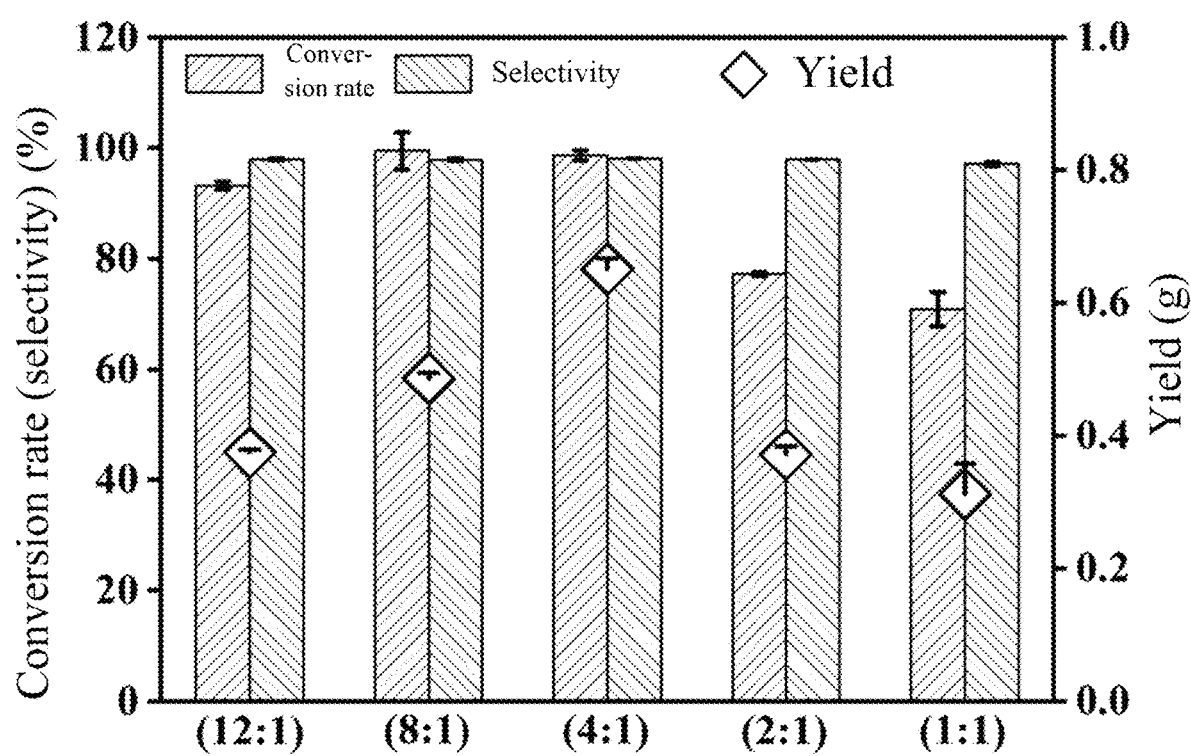
FIG. 5 shows the influence of different cobalt/2-methylimidazole molar ratios on the performance of a catalyst and the mass of a product.

As shown in FIG. 5, when a total mass of 2-methylimidazole and cobalt acetate tetrahydrate is fixed, a yield of a support/catalyst increases first and then decreases with the change of a molar ratio of 2-methylimidazole to cobalt acetate tetrahydrate. Different molar ratios will affect the extent of a reaction between the raw materials to affect the yield of CN and the performance of Pd@CN. When a relative content of 2-methylimidazole is relatively high, the full contact with the cobalt source is not allowed, the transition-state ZIF is generated, and CN derived from the transition-state ZIF has well-developed pore structures, resulting in excellent performance. When the relative content of 2-methylimidazole is relatively low, the raw materials fully react to produce partial ZIF, and CN derived from ZIF has reduced pore structures, resulting in low performance. The excessive 2-methylimidazole will volatilize, which leads to an increased cost. When a molar ratio of 2-methylimidazole to cobalt acetate tetrahydrate is 4:1, Pd@CN has a high catalytic activity, and a yield of a CN support is the maximum.

Figure 2A:
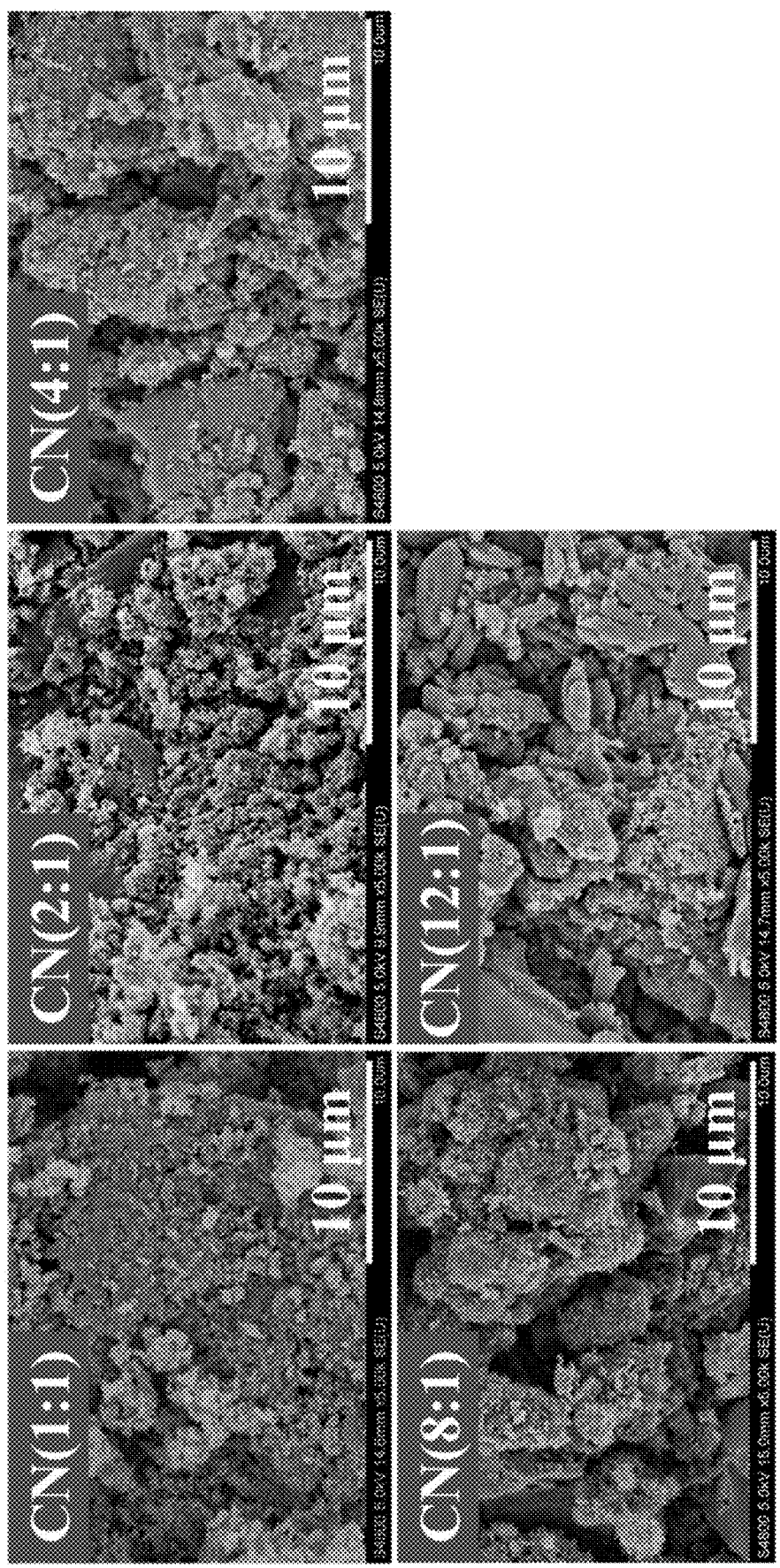
FIGS. 2A-2B show the scanning electron microscopy (SEM) images (FIG. 2A) and X-ray diffraction (XRD) patterns (FIG. 2B) of CN materials.
Figure 2B:
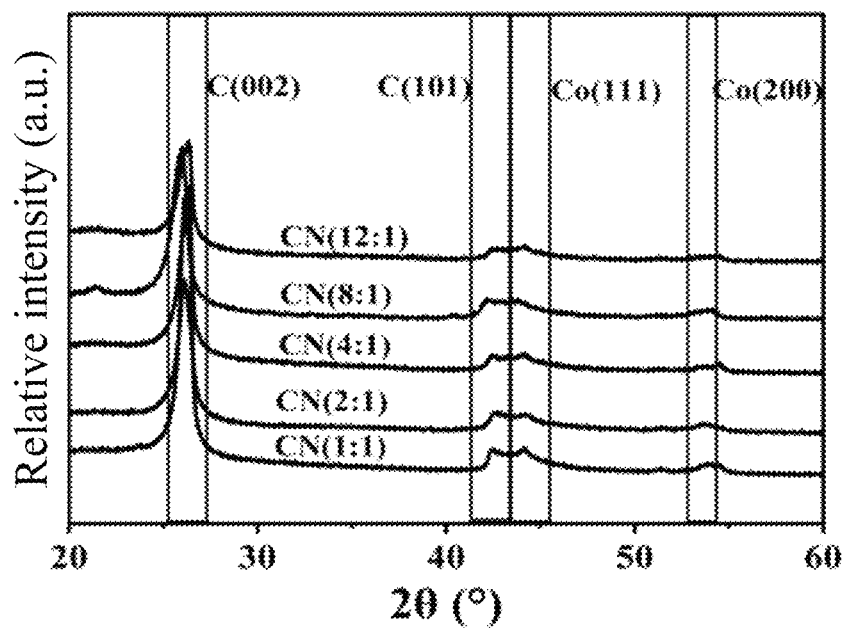
Figure 3A:
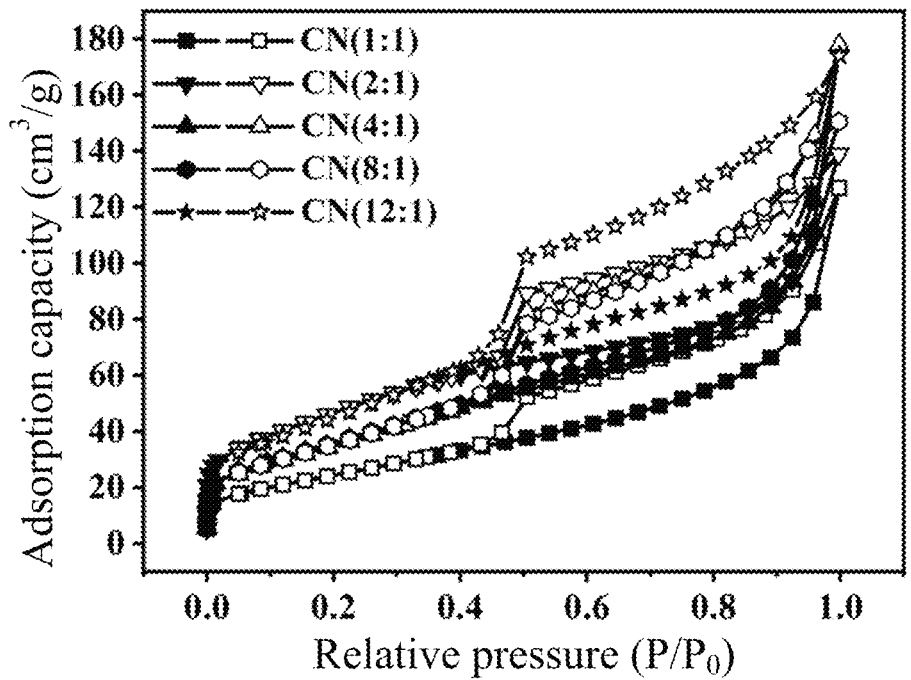
FIGS. 3A-3B show the $N_2$ adsorption-desorption (FIG. 3A) and pore size distribution curves (FIG. 3B) of CN materials.
Figure 3B:
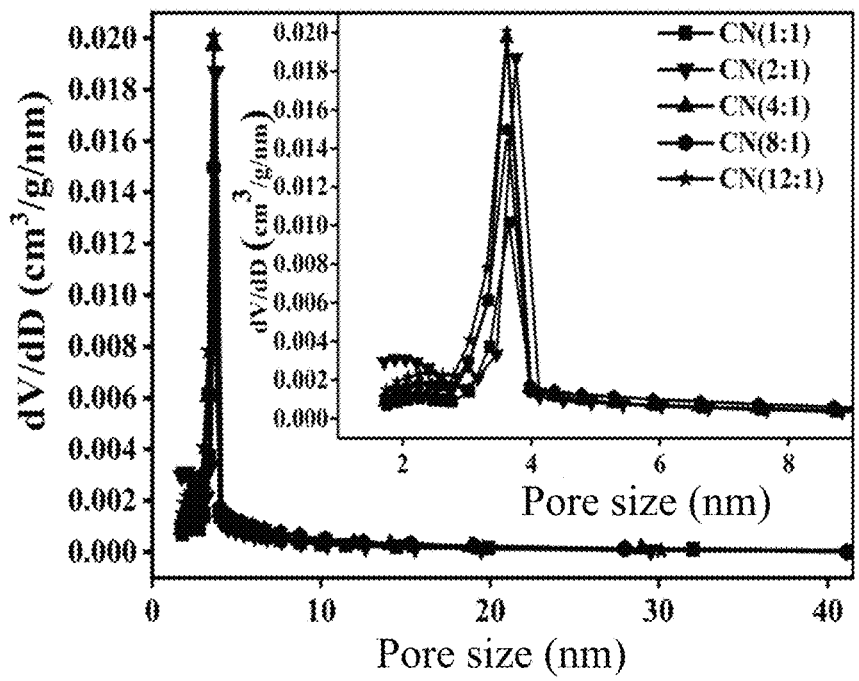
Figure 4:
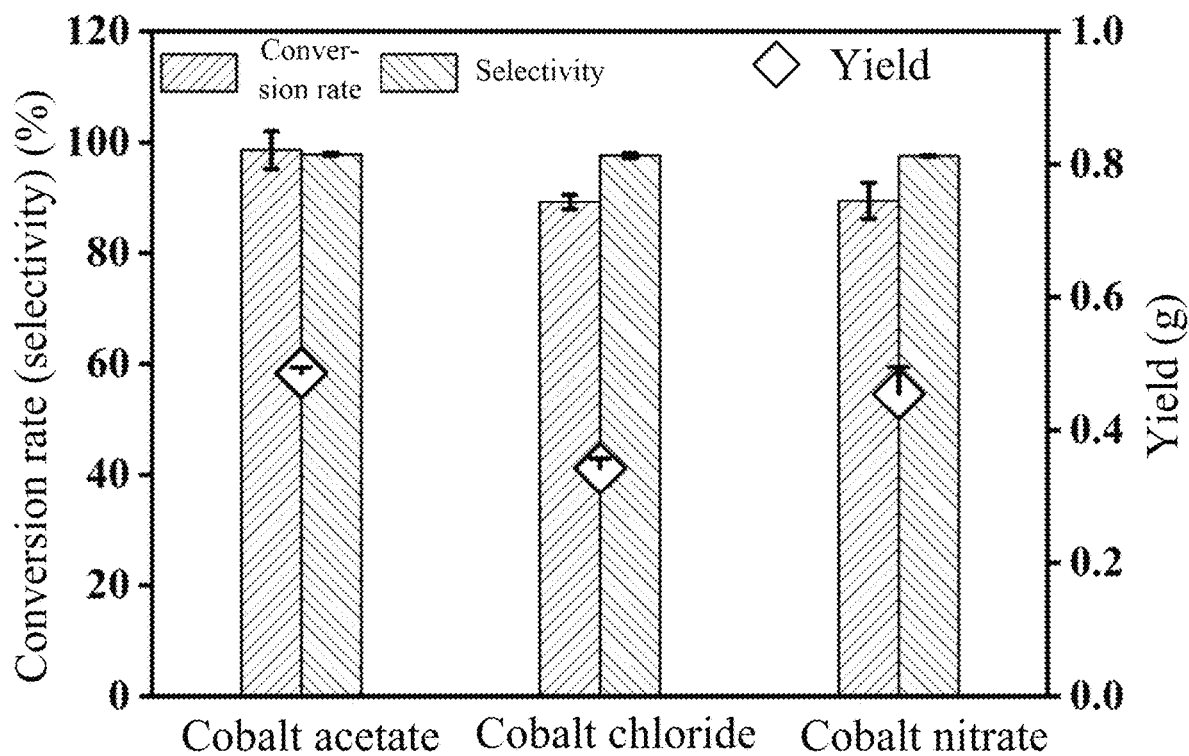
FIG. 4 shows the influence of different cobalt sources on the performance of a catalyst and the mass of a product.
Figure 6:
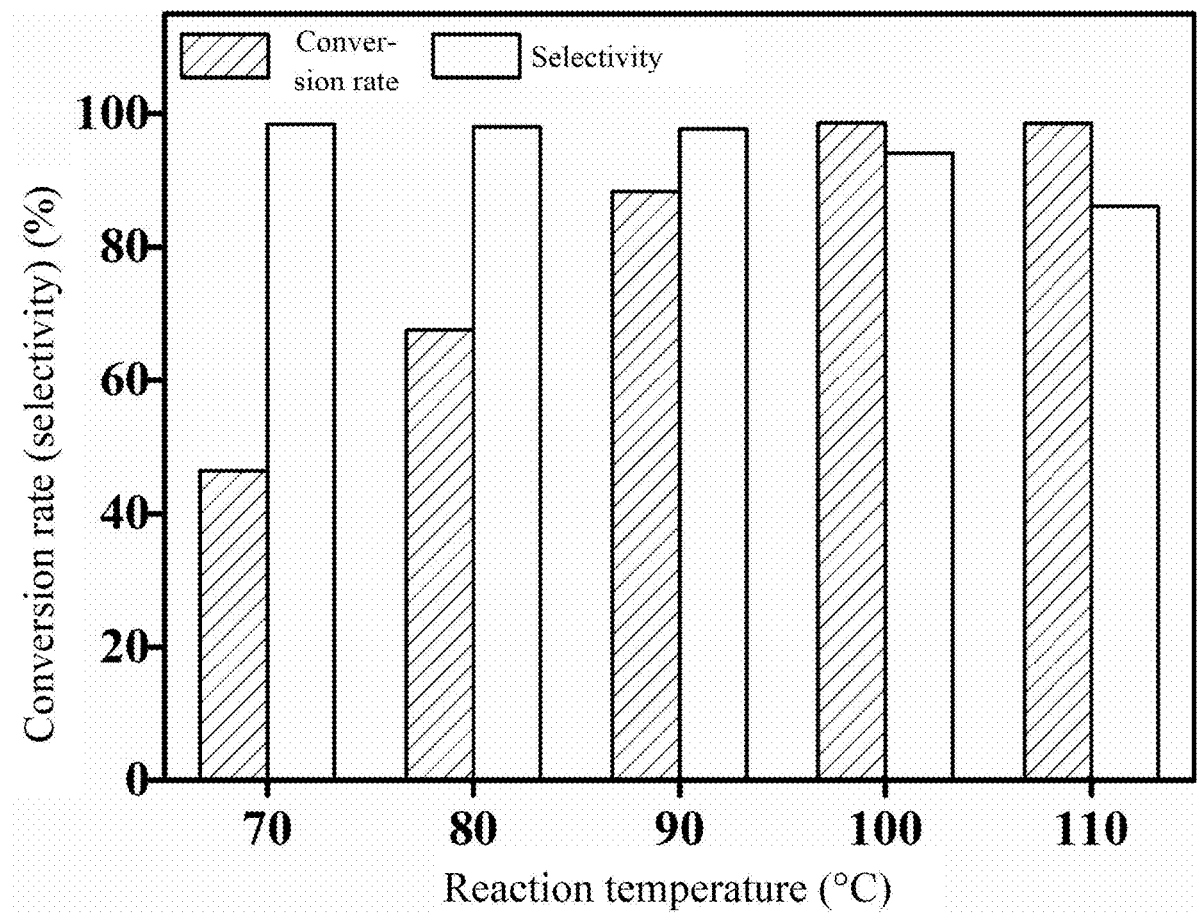
FIG. 6 shows the change of a reaction of Pd@CN with the temperature.
Figure 7:
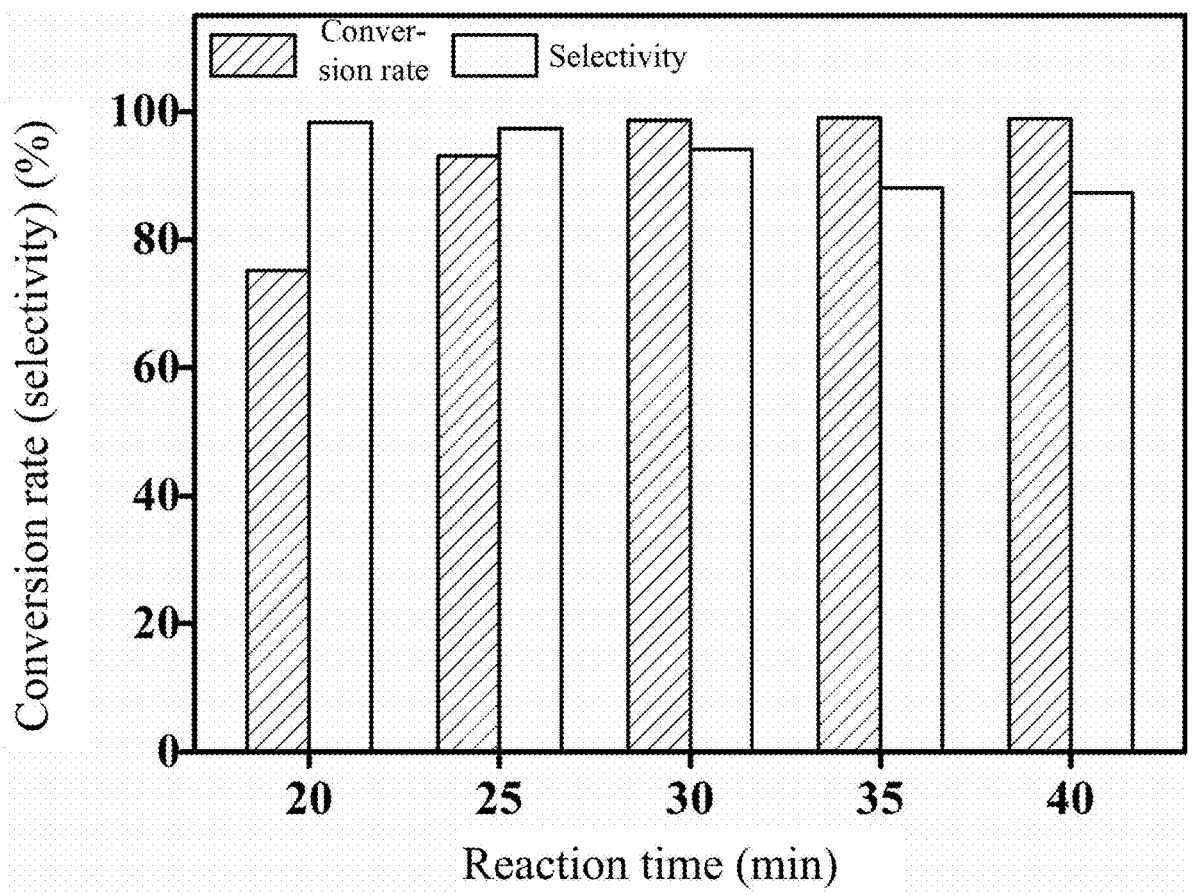
FIG. 7 shows the change of a reaction of Pd@CN with the time.

Explanation of other accompanying drawings: FIG. 1 shows the yields of CN and CN-67. It can be seen from this figure that a yield of CN prepared by the direct mixing method is 0.45 g and a yield of CN-67 prepared by the traditional method is 0.21 g. The direct mixing method leads to a higher yield of CN than the traditional method. FIGS. 2A-2B show the SEM images and XRD patterns of CN. It can be seen from the XRD patterns that the materials prepared at different molar ratios are CN materials including Co nanoparticles. It can be seen from the SEM images that CNs all have irregular massive structures, carbon nanotubes on the surface, and well-developed pore structures. FIGS. 3A-3B show the $N_2$ adsorption-desorption and pore size distribution curves. It can be seen from this figure that CNs prepared at different molar ratios all have rich pore structures. FIG. 4 shows the influence of different cobalt sources on the performance of a catalyst. It can be seen from this figure that different cobalt sources will affect the yield and performance of a catalyst. FIG. 5 shows the influence of different molar ratios on the performance of a catalyst. It can be seen from this figure that the molar ratio has a significant impact on the yield and performance of a catalyst. FIG. 6 shows the influence of a reaction temperature on the reaction performance. It can be seen from FIG. 6 that, with the increase of a reaction temperature, a conversion rate of phenol first increases and then remains unchanged, and the selectivity of cyclohexanone remains unchanged and then decreases. When the reaction temperature is 100° C., the conversion rate of phenol and the selectivity of cyclohexanone are high. FIG. 7 shows the influence of a reaction time on the reaction performance. It can be seen from FIG. 7 that the longer the reaction time, the higher the conversion rate of phenol, and when the conversion rate of phenol reaches 99%, the conversion rate of phenol does not change with the further extension of the reaction time. However, the selectivity of cyclohexanone always decreases with the extension of the reaction time. When the reaction time is 30 min, the conversion rate of phenol and the selectivity of cyclohexanone both are high, which fully meet the requirements for catalysts in industrial production.

In summary, the preparation method for ZIF-derived CN materials provided by the present disclosure has advantages such as simple process flow, short preparation cycle, high utilization of organic ligands, high catalyst yield, and environmental friendliness. A Pd@CN catalyst can be prepared through the loading of Pd. The Pd@CN catalyst can exhibit a significant catalytic effect when used in a system of phenol hydrogenation to produce cyclohexanone. This is because Pd@CN has a large specific surface area, rich pore structures, a high mesoporosity, and abundant defect sites. The large specific surface area and the abundant defect sites are conducive to the anchoring and dispersion of Pd to improve the utilization of Pd. The rich pore structures and high mesoporosity can reduce the diffusion resistance, promote the mass transfer, and improve the utilization of active sites, thereby improving the activity of the catalyst. This method provides a new idea for the batch production of ZIF-derived CN materials and the further application of ZIF-derived CN materials in the catalysis field.

The above are only preferred examples of the present disclosure, and are not intended to limit the present disclosure in other forms. Any person skilled in the art may change or modify the technical content disclosed above into an equivalent example to be applied in other fields. Any simple amendment or equivalent change and modification of the above example made according to the technical essence of the present disclosure without departing from the content of the technical solutions of the present disclosure shall fall within the protection scope of the technical solutions of the present disclosure.

What is claimed is:

1. A simple preparation method of a support of a catalyst for hydrogenation, comprising the following steps:
   step 1, mixing 2-methylimidazole with a cobalt source to produce a mixture;
   step 2, calcining the mixture obtained in the step 1 in an Ar atmosphere to produce Co@CN;
   step 3, adding deionized water and a concentrated nitric acid solution to the Co@CN and stirring; and
   step 4, conducting suction filtration to produce a solid, washing the solid several times with deionized water, and oven-drying to produce a nitrogen-doped carbon (CN) support;
   wherein in the step 3, the concentrated nitric acid solution has a mass fraction of 66%, the Co@CN, the deionized water, and the concentrated nitric acid solution are in a mass ratio of 1:(20-30):(20-30), and the stirring is conducted for 30 min to 90 min at a temperature of 30° C. to 90° C. and a rate of 50 rpm to 300 rpm.

2. The simple preparation method of the support of the catalyst for hydrogenation according to claim 1, wherein in the step 4, the solid is washed 2 times to 5 times and oven-dried at 40° C. to 100° C. for 3 h to 5 h.

3. A preparation method of a catalyst for phenol hydrogenation to prepare cyclohexanone, comprising: dispersing Pd(OAc)$_2$ in acetone to produce a solution; adding the CN support prepared by the simple preparation method according to claim 1 to the solution, and stirring to allow impregnation; conducting rotary evaporation to remove the acetone; and oven-drying to produce a Pd@CN catalyst.

4. The preparation method of the catalyst according to claim 3, wherein the Pd(OAc)$_2$, the CN support, and the acetone are in a mass ratio of 1:20:(2,000-3,000), the stirring is conducted for 9 h to 15 h at a temperature of 10° C. to 40° C. and a rate of 50 rpm to 300 rpm, the rotary evaporation is conducted at 50° C. to 90° C. for 15 min to 45 min, and the oven-drying is conducted at 40° C. to 100° C. for 3 h to 5 h.

5. The preparation method of the catalyst according to claim 3, wherein in the step 1 of the simple preparation method, the cobalt source is any one of cobalt acetate tetrahydrate, cobalt chloride hexahydrate, and cobalt nitrate hexahydrate, and a molar ratio of the 2-methylimidazole to the cobalt source is (1-12):1.

6. The preparation method of the catalyst according to claim 5, wherein the Pd(OAc)$_2$, the CN support, and the acetone are in a mass ratio of 1:20:(2,000-3,000), the stirring is conducted for 9 h to 15 h at a temperature of 10° C. to 40° C. and a rate of 50 rpm to 300 rpm, the rotary evaporation is conducted at 50° C. to 90° C. for 15 min to 45 min, and the oven-drying is conducted at 40° C. to 100° C. for 3 h to 5 h.

7. The preparation method of the catalyst according to claim 3, wherein in the step 2 of the simple preparation method, the calcining is conducted in a tube furnace with a heating rate of 1° C./min to 10° C./min, a calcining temperature of 550° C. to 1,000° C., and a heat-preservation time of 100 min to 150 min.

8. The preparation method of the catalyst according to claim 7, wherein the Pd(OAc)$_2$, the CN support, and the acetone are in a mass ratio of 1:20:(2,000-3,000), the stirring is conducted for 9 h to 15 h at a temperature of 10° C. to 40° C. and a rate of 50 rpm to 300 rpm, the rotary evaporation is conducted at 50° C. to 90° C. for 15 min to 45 min, and the oven-drying is conducted at 40° C. to 100° C. for 3 h to 5 h.

9. The preparation method of the catalyst according to claim 3, wherein in the step 3 of the simple preparation method, the concentrated nitric acid solution has a mass fraction of 66%, the Co@CN, the deionized water, and the concentrated nitric acid solution are in a mass ratio of 1:(20-30):(20-30), and the stirring is conducted for 30 min to 90 min at a temperature of 30° C. to 90° C. and a rate of 50 rpm to 300 rpm.

10. The preparation method of the catalyst according to claim 3, wherein in the step 4 of the simple preparation method, the solid is washed 2 times to 5 times and oven-dried at 40° C. to 100° C. for 3 h to 5 h.

\* \* \* \* \*